United States Patent
Tsutiya et al.

(10) Patent No.: US 6,475,679 B1
(45) Date of Patent: Nov. 5, 2002

(54) NON-AQUEOUS ELECTROLYTE SECONDARY BATTERY

(75) Inventors: Hiromu Tsutiya, Tokyo (JP); Hiroshi Kawakabe, Tokyo (JP); Atsushi Wakui, Tokyo (JP); Tomohisa Kamata, Tokyo (JP); Huy Sam, Tokyo (JP)

(73) Assignees: Nippon Chemical Industrial Co., Ltd., Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/601,263
(22) PCT Filed: Nov. 24, 1999
(86) PCT No.: PCT/JP99/06554
§ 371 (c)(1), (2), (4) Date: Sep. 5, 2000
(87) PCT Pub. No.: WO00/33410
PCT Pub. Date: Jun. 8, 2000

(30) Foreign Application Priority Data

Nov. 30, 1998 (JP) .............................. 10-338346

(51) Int. Cl.[7] ................................................ H01M 6/16
(52) U.S. Cl. ........................ 429/339; 429/314; 429/315; 429/324
(58) Field of Search ................................ 429/314, 315, 429/324, 339

(56) References Cited

U.S. PATENT DOCUMENTS 5,665,491 A * 9/1997 Tomiyama et al. ...... 429/218.1
5,733,683 A * 3/1998 Searson et al. ............ 429/212

FOREIGN PATENT DOCUMENTS

| DE | 19707817 A1 | * 3/1998 | .......... H01M/10/26 |
| JP | 63-187578 A | 8/1988 | |
| JP | 6-13108 A | 1/1994 | |
| JP | 11-191431 A | 7/1999 | |

* cited by examiner

Primary Examiner—Carol Chaney
Assistant Examiner—Dah Wei Yuan
(74) Attorney, Agent, or Firm—Armstrong, Westerman & Hattori, LLP (57) ABSTRACT

There is provided a non-aqueous electrolyte battery including a positive electrode, a negative electrode capable of occluding and emitting lithium ions, and a non-aqueous electrolyte containing lithium ion, in which the above-mentioned non-aqueous electrolyte is a solution containing at least one kind of the phosphazene derivatives selected from the group consisting of the phosphazene derivatives expressed by the following formula:

$$(R^1O)_3P=N-SO_3R^1,$$

where $R^1$ denotes a same or different monovalent organic group and phosphazene derivatives expressed by the following formula:

$$(R^2O)_3P=N-SO_2-N=P(OR^2)_3,$$

where $R^2$ denotes a same or different monovalent organic group, and a lithium salt, which is capable of controlling the evaporation and decomposition of an electrolyte whose base is an organic solvent in a wide range of temperature, excels in high-temperature preservability, and exhibit superior cell performance with reduced danger of bursting and ignition.

6 Claims, 1 Drawing Sheet

NON-AQUEOUS ELECTROLYTE SECONDARY BATTERY

FIELD OF THE INVENTION

This invention relates to a non-aqueous electrolyte battery that controls vaporization and decomposition of the electrolyte using an organic solvent as a base material and provides excellent cell performance. More specifically the invention relates to the non-aqueous electrolyte battery that has excellent cell performance, high-temperature preservability and reduced danger of bursting and ignition even in the case of short-circuiting.

BACKGROUND OF THE INVENTION

Recently non-aqueous electrolyte secondary batteries have drawn public attention as batteries for backing up information-processing equipment such as personal computers, VTRs, etc. and memories for AV (audio visual) equipment as well as for driving these devices because they have superior self-discharge characteristics such as high-voltage output and high energy density.

Although the non-aqueous electrolyte secondary battery exhibits such high performance as mentioned above, it has certain disadvantages. For example, in the lithium battery which uses pure lithium metal for the negative electrode thereof, alkaline metal especially lithium metal, lithium alloys, etc. that are used in the negative electrode of the above-mentioned battery are highly active to water. When water is intruded into the battery because of incomplete sealing of the sealed entrance thereof, there is a fear of generating hydrogen and occurrence of ignition due to the reaction between the above-mentioned negative electrode and water. Moreover, since lithium metal has a low melting point of approximately 170° C., there is always a possibility that the battery goes into abnormal heat generation and hence runs into an excessively dangerous condition such as melting of the battery itself or the like if the battery discharges a large amount of current abruptly in the case of short-circuiting. In addition, if the electrolyte whose base material is an organic solvent evaporates or decomposes by itself to produce a gas with the heat generation of the battery or if the battery is misused, the gas may cause bursting and ignition.

As method for avoiding danger of bursting and ignition of the battery in the case of short-circuiting, there have been proposed many methods, for example, in the following: (a) a method (Japanese Unexamined Patent Application Publication No. 01-14877) where a non-aqueous electrolyte is used that is made by dissolving $LiCF_3 SO_3$ as a solute in an electrolyte composed of a mixture of sulfolane and one kind of organic solvent selected from the group consisting of dimethoxyethane, tetrahydrofuran, diethoxyethene, 2-methyldioxolane, 4-methyldioxolane, and dioxolane; (b) a method (Japanese Unexamined Patent Application Publication No. 01-14878) where an electrolyte is used that is made by dissolving $LiCF_3 SO_3$ as a solute in either organic solvent of N, N-dimethylformamide or N, N-diethylamide; (c) a method (Japanese Unexamined Patent Application Publication No. 01-14879) where an electrolyte is used that is made by dissolving at least one substance selected from the group consisting of $LiPF_6$ and $LiBF_4$ as a solute in an electrolyte made by mixing sulfolane and at least one kind of organic solvent selected from the group consisting of dimethoxyethane, 2-methyldioxolane, 4-methyldioxolane, and 4-tetrafuran; (d) a method (Japanese Unexamined Patent Application Publication No. 01-14880) where an electrolyte is used that is made by dissolving at least one substance selected from the group consisting of $LiCF_3 SO_3$, $LiPF_6$, $LiAsF_6$, $LiClO_4$ in a mixture of a high-permittivity organic solvent whose permittivity is 30 or more at 20° C. and a low-viscosity organic solvent whose inflammation point is 30° C. or more; (e) a method (Japanese Unexamined Patent Application Publication No. 02-165565) where oligoalkylene oxypolyphosphazen having a fluoroalkylsulfon group is used as an electrolyte; (f) a method (the Japanese Unexamined Patent Application Publication No. 04-184870) where a lower phosphate ester is used as a solution of the electrolyte or a co-solvent; (g) a method (Japanese Unexamined Patent Application Publication No. 06-283205) where a flame retarder such as perfluorocarbon that is a fluorine compound inert liquid, phosphide, etc. is made to be contained in an electrolytic solution. On the other hand, as a non-aqueous electrolyte to be used for the lithium battery and the lithium ion secondary battery, widely used is a substance made by dissolving $LiPF_6$ as an additional electrolyte in a carbonate system electrolyte such as propylene carbonate, diethyl carbonate, etc. because it has a relatively high conductivity and is stable in the electric potential. Among the batteries which use these non-aqueous electrolytes, the lithium ion secondary battery is well known to have higher safety compared to batteries which use lithium metal. These carbonate system non-aqueous solvents are said to be electrochemically relatively stable, but since in the non-aqueous electrolyte battery, oxidizability and reducing power of the positive and negative electrodes are exceedingly strong; therefore there is a possibility that these carbonate system non-aqueous solvents may react with the positive electrode active materials. If such a reaction occur, a reaction products and decomposition products grow on the surface of the electrode as a film, which increases the impedance of the battery. As a result, there is a problem that when the battery is discharged with a specially large current, the voltage decreases significantly to deteriorate cycling and load characteristics.

For a method for controlling decomposition of the non-aqueous electrolyte, proposed are a method (J. L. Goldman, R. M. Mank. J. H. Young and V. R. Koch: J. Electrochem. Soc., 127,1461(1980)) where some of hydrogen atoms of a cyclic ether such as tetrahydrofuran, 1,3-dioxolane, etc. are substituted with an alkyl group to stabilize it by transforming into 2-methyltetrahydrofuran, 4-methyl-1,3-dioxolane, etc. and a method (Japanese Unexamined Patent Application Publication No. 07-320779) whereby a sulfide compound such as methylphenyl sulfide, diphenyl sulfide, thianthrene, 1,8- disulfide naphthalene, etc. is added to the non-aqueous electrolyte.

Further, in the Japanese Patent Application Unexamined Publication No. 06-13108, disclosed is a fact that by using a solution such that a lithium salt is dissolved in a phosphazene derivative having a viscosity less than 300 cP at 25° C. as an electrolyte for a non-aqueous electrolyte secondary battery, safe and excellent cell performance was given to the battery. The phosphazene derivatives disclosed here are a cyclophosphazene which is expressed by $(NPR_2)n$, where R denotes a monovalent organic group and n is a number of 3 to 15 and a linear phosphazene derivative which is expressed by $R_3 (P=N)_m$—$PR_4$, where m denotes a number of 1 to 20, and R is selected from the group consisting of monovalent organic groups, O, and C.

However, a method as mentioned above wherein a kind of a chemical is added to the conventional electrolyte can be effective only in the range of ordinary temperature but has a disadvantage, from the point of view of the decomposition of the electrolyte, that the decomposition of the electrolyte still continues at a high temperature, and hence the cycling characteristic deteriorates. From the point of view of flame-proofing of the electrolyte, the method has a disadvantage that although the flame resistance is improved to some degree, at the same time the cell performance deteriorates. Moreover, also regarding the phosphazene derivative, a compound that can give much more excellent cell performance has been desired to come into being.

Therefore, it is an object of the present invention to provide a non-aqueous electrolyte battery that is capable of controlling evaporation and decomposition of the electrolyte whose base material is an organic solvent throughout a wide range of temperatures, reducing danger of bursting and ignition when short circuiting, and excelling especially in high-temperature preservability, resulting in superior cell performance.

DISCLOSURE OF THE INVENTION

Under such conditions of the current technology, the present inventors carried out intensive examination for the non-aqueous electrolyte battery and discovered that if a specified phosphazene derivative having a sulfonyl group was made to be contained in the electrolyte of the non-aqueous electrolyte battery, the phosphazene derivative so contained was able to prevent evaporation and decomposition of the electrolyte throughout a wide rage of temperatures, especially at a high-temperature, and thereby can give flame resistance to the non-aqueous electrolyte, reduce the danger of the ignition and inflammation. At the same time, excellent cell performance can be obtained, leading to the present invention.

That is, the present invention provides a non-aqueous electrolyte battery including a positive electrode, a negative electrode capable of occluding and emitting lithium ions, and a non-aqueous electrolyte containing lithium ion, characterized in that the non-aqueous electrolyte is a solution containing at least one kind of the phosphazene derivatives selected from the group consisting of the phosphazene derivatives expressed by a general formula (1):

$(R^1O)_3P=N—SO_3R^1$      (1)

where $R^1$ denotes a same or different monovalent organic group in the expression and phosphazene derivatives expressed by a general formula (2):

$(R^2O)_3P=N—SO_2—N=P(OR^2)_3$      (2)

where $R^2$ denotes a same or different monovalent organic group, and a lithium salt.

DETAIL DESCRIPTION OF THE INVENTION

Best Embodiment for implementing the Invention

The electrolyte of the non-aqueous electrolyte battery of the present invention is a solution containing at least one kind of a phosphazene derivative selected from the phosphazene derivatives expressed by either of the above-mentioned general formula (1) and the above-mentioned general formula (2) and a lithium salt, and preferably, is a solution made by dissolving the lithium salt in a mixed solvent of the phosphazene derivative and an aprotic organic solvent.

For a monovalent organic group of $R^1$ in the above-mentioned general formula (1) in the present invention, there can be enumerated: linear or branched alkyl groups of a carbon number of 1 to 10; alkyl groups of a carbon number of 1 to 10 substituted by a group having an ether linkage; alkyl groups substituted by more than one halogen atom. For such alkyl groups, there can be enumerated, for example: methyl group, ethyl group, n-propyl group, isopropyl group, n-butyl group, isobutyl group, sec-butyl, n-hexyl group, isohexyl group, n-heptyl group, n-octyl group, isooctyl group, n-decyl group, and isodecyl group, etc. Alkyl group with an ether linkage in it is allowed to have more than one ether linkage. Moreover, halogen atoms in these organic groups are not limited to a specified halogen atom, but chlorine atom or fluorine atom is preferable.

For a method for manufacturing such phosphazene derivatives expressed in the above-mentioned general formula (1), there can be numerated, for example, a method based on the following reaction formula (1) and the following reaction formula (2).

$2PX_5+H_2N—SO_3H \rightarrow X_3P=N—SO_2$
   $—X$(General formula (3)),      Reaction formula (1);

(X in the formula denotes a halogen atom.)

$X_3P=N—SO_2—X$(General formula (3))$+4R^1—OM$(General formula (4))$\rightarrow(R^1O)_3P=N—SO_3R^1$
   (General formula (1))      Reaction formula (2);

(M in the formula denotes an alkali metal, and X and $R^1$ are the same as the above-mentioned).

That is, the halogenated phosphazene derivative expressed by the general formula (3) in the above-mentioned reaction formula (1) can be easily obtained by making a phosphorus halide and sulfamic acid react in an organic solvent. In this case, the molar ratio of sulfamic acid to phosphorus halide is generally 0.4 to 1.0, preferably 0.5 to 0.6; the reaction temperature is generally 80 to 150° C., preferably 90 to 110°°C.; and the reaction time is generally 3 to 24 hours, preferably 6 to 12 hours. The reaction solvent is not limited to a specified substance so long as the reaction solvent can dissolve phosphorus halide and sulfamic acid and is inert. There can be enumerated, for example: aromatic hydrocarbons such as toluene, xylene, benzene, etc.; nitrites such as acetonitrile, propionitrile, etc.; halogenated aromatic hydrocarbons such as chlorobenzene etc.; haloalkanes such as methylene chloride, chloroform, etc.; which can be used singly or as a combination of two or more kinds of substances enumerated. The halogen atom is preferably chlorine atom. After the end of reaction, the objective substance is obtained by a routine procedure such as drying out, purification, etc.

The phosphazene derivative expressed by the above-mentioned general formula (1) in the above-mentioned reaction formula (2) can be easily obtained by making the halogenated phosphazene derivative expressed in the above-mentioned general formula (3) and the alcoholate expressed in the above-mentioned general formula (4) react in an organic solvent. The molar ratio of the alcoholate to the halogenated phosphazene derivative is generally 0.5 to 6, preferably 3.6 to 4.4 The reaction temperature is generally −50 to 50° C., preferably −40 to −20° C., and the reaction time is generally 0.5 to 24 hours, preferably 3to 12 hours. The reaction solvent is not limited to a specified substance as long as the reaction solvent can dissolve the halogenated phosphazene derivative and the alcoholate and is an inert solvent. There can be enumerated, for example: the hydrocarbon, the halogenated aromatic hydrocarbon, haloalkane, dioxane, tetrahydrofuran, ethers such as dibutyl ether etc., acetonitrile, propionitrile, etc.; which can be used singly or as a combination of two or more kinds of the substances enumerated. After the reaction ended, the objective substance is obtained by a routine procedure such as extraction, dehydration, drying out, etc.

On the other hand, for the monovalent organic group of $R^2$ in the phosphazene derivative expressed in the above-mentioned general formula (2), there can be enumerated the same substance as $R^1$ in the above-mentioned general formula (1).

For the method for manufacturing the phosphazene derivative expressed in the above-mentioned general formula (2), there can be enumerated, for example, a method based on the following reaction formula (3) and the following reaction formula (4).

$2PX_5+H_2N-SO_2-NH_2 \rightarrow X_3P=N-SO_2-N=PX_3$(General Formula (5))  Reaction formula (3);

(X in the formula denotes a halogen atom.)

$X_3P=N-SO_2-N=PX_3$(General Formula (5))+$6R^2$—OM(General Formula (6))$\rightarrow(R^2O)_3P=N-SO_2-N=P(OR^2)_3$(General Formula (2))  Reaction formula (4);

(M and X in the formula are the same as the above-mentioned. $R^2$ is the same as the above-mentioned $R^1$.)

That is, the halogenated phosphazene derivative expressed by the general formula (5) in the above-mentioned reaction formula (3) can be easily obtained by making phosphorus halide and sulfamide react in an organic solvent. In this case, the moral ratio of sulfamide to phosphorus halide is generally 0.4 to 1, preferably 0.4 to 0.6; the reaction temperature is generally 80 to 120° C., preferably 100 to 120° C., and the reaction time is generally 1 to 6 hours, preferably 2 to 4 hours. The reaction solvent is not limited to a specified substance so long as the reaction solvent can dissolve phosphorus halide and sulfamide and is inert. There can be enumerated, for example: aromatic hydrocarbons such as toluene, xylene, benzene, etc.; haloalkanes such as 1,1,1-trichloroethane, 1,1,2-trichloroethane, 1,1,1,2-tetrachloroethane, 1,1,2,2-tetrachloroethane, etc.; and the like; which can be used singly or as a combination of two or more kinds of the substances enumerated. After the end of reaction, the objective substance is obtained by a routine procedure such as drying out, purification, etc.

The phosphazene derivative expressed by the general formula (2) in the above-mentioned reaction formula (4) can be easily obtained by making the halogenated phosphazene derivative expressed in the above-mentioned general formula (5) and the alcoholate expressed in the above-mentioned general formula (6) react in an organic solvent. The molar ratio of the alcoholate expressed in the above-mentioned general formula (6) to the halogenated phosphazene derivative expressed in the above-mentioned general formula (5) is generally 5 to 7, preferably 5.6 to 6.6. The reaction temperature is generally −50 to 0° C., preferably −40 to −20° C., and the reaction time is generally 2 to 24 hours, preferably 3 to 12 hours. The reaction solvent is not limited to a specified substance so long as the reaction solvent can dissolve the above-mentioned halogenated phosphazene derivative and the above-mentioned alcoholate and is an inert solvent. There can be enumerated, for example: ethers such as dioxane, tetrahydrofuran, dibutyl ether; acetonitrile; propionitrile, etc.; which can be used singly or as a combination of two or more kinds of the substances enumerated. The halogen atom of X and the alkaline metal in the general formula (6) are not limited especially. Moreover, after the end of reaction, the objective substance is obtained by a routine procedure such as filtration, drying out, etc.

In the electrolyte of the non-aqueous electrolyte battery of the present invention, impurities that might be incorporated unavoidably in the manufacture of the above-mentioned phosphazene derivative are allowed to exist so long as they are included to such an extent that does not impair the cell performance. Therefore the electrolyte can be used in conjunction with flame retardant compounds, for example phosphate ester, carbonic ester, etc.

Preferably, a mixed solvent made by mixing the above-mentioned phosphazene derivative and the aprotic organic solvent is used for the electrolyte of the non-aqueous electrolyte battery according to the present invention. The aprotic organic solvent is not limited to a specified substance, and there can be enumerated, for example: γ-butyrolactone, 2-methyltetrahydrofuran, dimethyl sulfoxide, 1,3-dioxolane, sulfolane, dimethyl carbonate, diethyl carbonate, methyl acetate, 1,2-dimethoxyethane, tetrahydrofuran, propylene carbonate, ethylene carbonate, butylene carbonate, formamide, dimethyl formamide, acetonitrile, nitromethane, methyl formate, methyl acetate, phosphotriester, trimethoxymethane, 3-methyl-2-oxazolidinone, ether compounds and ester compounds such as diethyl ether, 1,3-propanesultone, etc.; which can be used singly or as a combination of at least two kinds of the substances enumerated.

The blending ratio of the above-mentioned phosphazene derivative is usually in a range of 0.1 to 80 volume % in unit of volume fraction in a non-aqueous electrolyte, and the blending ratio can be arbitrarily designed according to the purpose in the present invention. When the phosphazene derivative expressed in the above-mentioned general formulae (1) or (2) is used as a trapping or stabilizing agent for the positive electrode active material, the negative electrode active material, especially for free acids, hydrofluoric acid, etc. that are transformed from decomposition products such as electrolyte salt etc., in a process of the cycle of the battery at a high temperature, especially in a repetitive process of doping/de-doping of lithium, the blending ratio of the above-mentioned phosphazene derivative is set to be generally 0.1 to 20 volume %, preferably 0.1 to 10 volume %, in a non-aqueous electrolyte because the phosphazene derivative exhibits basicity, and thereby the cycling characteristics and high-temperature preservability of the non-aqueous electrolyte battery can be improved.

Further, when the phosphazene derivative is used to give flame resistance to the non-aqueous electrolyte battery to prevent the bursting and ignition thereof, the blending ratio of the above-mentioned phosphazene derivative is set to be generally in a range of 1 to 80 volume %, preferably in a range of 10 to 40 volume %, in a non-aqueous electrolyte. When the blending ratio is less than 1 volume %, the amount of the phosphazene derivative is not sufficient to prevent the bursting and ignition of the battery. On the other hand, when the blending ratio exceeds 80 volume %, the viscosity of the solution is increased and hence lithium ion conductivity suitable for large current discharge is difficult to obtain, and also the cell performance when being used at a low temperature under the freezing point tends to decrease; therefore such blending ratio is not preferable.

The lithium salt to be dissolved in the above-mentioned mixed solvent is not limited to a specified substance so long as the lithium salt can be dissolved in the mixed solvent. There can be enumerated, for example: $LiClO_4$, LiCl, LiBr, LiI, LiBF$_4$, LiPF$_6$, LiCF$_3$SO$_3$, LiAsF$_6$, LiAlCl$_4$, LiB(C$_6$H$_6$)$_4$, LiSbF$_6$, LiB$_{10}$Cl$_{10}$, LiSiF$_6$, LiN(SO$_2$CF$_3$)$_2$, LiC(SO$_2$CF$_3$)$_2$, lower fatty acid lithium carboxylate, chloroborane lithium, lithium tetraphenyl borate, etc., which can be used singly or as a mixture of at least two kinds of substances enumerated. Preferable amount of the addition of these lithium salts is 0.1 to 3 moles to 1 kg of the above-mentioned solvent, and preferably 0.5 to 2 moles.

To improve the discharging and charging characteristics, the following compounds can be added to the electrolyte of the non-aqueous electrolyte battery of the present invention. There can be enumerated, for example: triethyl phosphite, triethanolamine, cyclic ether, ethylenediamine, n-glyme, hexaphosphoric triamide, nitrobenzene derivatives, sulfur, the quinoneimine dye, N-substituted oxazolidinone, N, N-substituted imidazolidine, ethylene glycol dialkyl ether, ammonium salts, polyethylene glycol, pyrrole, 2-methoxyethanol, aluminum trichloride, monomers of conductive polymer electrode active materials, triethylene phosphonamide, trialkylphosphine, morpholine, aryl compounds having a carbonyl group, hexamethylphosphoric triamide, 4-alkyl morpholine, bicyclic tertiary amines, oils, phosphonium salts, tertiary sulfonium salts, etc.

The positive electrode of the non-aqueous electrolyte battery of the present invention is made by applying and drying the positive electrode flux consisting of the positive electrode active material, a conductive agent, a binding agent, etc. on a collector. The positive electrode active material is not limited to a specified substance, and substances that are publicly known to those skilled in the art can be used. There can be enumerated, for example: metallic oxides such as V$_2$O$_5$, V$_3$O$_{13}$, V$_6$O$_{13}$, MnO$_2$, MoO$_3$, etc.; LiCoO$_2$, LiNiO$_2$, LiMn$_2$O$_4$, LiMnO$_2$, LiFeO$_2$; lithium complex metallic oxides including lithium and at least two kinds of metal elements selected from the transition metals of Co, Ni, Mn, Fe, V, Mo, Cu, Zn, etc.; these complex metallic oxides added with an addition agent such as a halide; metallic sulfides such as TiS$_2$, MoS$_2$, FeS$_2$, NbS$_2$, etc.; conductive polymers such as polypyrrole derivatives, polyaniline derivatives, polythiophene derivatives, etc.; graphite; and the like; and preferably the lithium complex metallic oxide is used among the above-enumerated.

The negative electrode of the non-aqueous electrolyte battery of the present invention is formed by applying and drying a negative electrode flux that contains the negative active material and the binding agent on the collector. For the collector, used is a metallic foil, for example, copper foil. For the negative electrode material, known negative electrode materials can be used, and there can be enumerated, for example: lithium metal; alloys of lithium and one element selected from the group consisting of aluminum, indium, lead, zinc etc.; crystalline complex oxides such as Ag$_2$O, TiO$_2$, Fe$_2$O$_3$, MgO, V$_2$O$_5$, NiO, CuO, ZnO, Mo$_2$O$_3$, In$_2$O$_3$, SnO, SnO$_2$, SnSiO$_3$, In$_2$Sn$_2$O$_7$, etc.; amorphous complex metal oxides, main example being tin oxide, which contains at least one kind of element selected from the group consisting of the first group of elements in the periodic table, the second group of elements, the 13th group of elements, the 14th group of elements, the 15th group of elements, transition metals, and halogen elements; a carbon material capable of doping and de-doping lithium, etc. Among these materials, most preferable is the carbon material capable of doping and de-doping lithium. As such carbon materials, there can be enumerated, for example, the non-graphitizable carbon material and the graphite system carbon material. Concretely, there can be enumerated: pyrolytic carbons, cokes, graphites, the glassy carbon fiber, the organic polymeric material burned substance, the carbon fiber, the activated carbon, etc. For cokes, there can be enumerated, for example: the pitch coke, the petroleum coke, the coal coke, etc. Here, the organic polymeric material burned substance stands for substances such that any organic polymer materials such as phenol resins, furan resins, etc. were sintered at a desired temperature and reduced to be carbon.

A conductive agent, a binding agent, a filler, etc. can be added to the electrode fluxes of the positive electrode flux and the negative electrode flux. The conductive agent is not limited to a specified substance so long as the conductive agent is an electron conductive material and does not undergo a chemical reaction in a constituted battery. There can be enumerated, for example: natural graphite, the artificial graphite, the carbon black, the acetylene black, KETJEN black, carbon fiber, metal powders, metallic fibers, polyphenylene derivatives, etc., which can be used singly or as a mixture of at least two kinds of substances enumerated. The binding agent is not limited to a specified substance, and there can be enumerated, for example: starch, polyvinyl alcohol, carboxymethylcellulose, hydroxypropylcellulose, regenerated cellulose, diacetylcellulose, polyvinylchloride, polyvinyl pyrrolidone, tetrafluoroethylene, polyvinylidene fluoride, polyethylene, polypropylene, ethylene-propylene copolymer (EPDM; ethylene propylene diene monomer), sulfonated EPDM, styrene-butadiene rubber, polybutadiene, fluoro rubber, polysaccharides such as polyethylene oxide etc., the thermoplastic resin, polymers having rubber elasticity, etc., which is used singly or as a mire of two kinds or more of substances enumerated.

The filler is not limited to a specified substance so long as a filler is a fiber material that does not undergo chemical change in a constructed battery. There can be generally enumerated: olefin polymers such as polypropylene, polyethylene, etc.; and fibers composed of glass, carbon, etc.

In the non-aqueous electrolyte battery of the present invention, preferably a separator is interposed between the above-mentioned positive and negative electrodes because it can prevent the short circuiting of the current due to contact of both electrodes. For the separator, there can be enumerated, for example: nonwoven fabric, thin layer film, etc. made of a synthesized resin such as polytetrafluoroethylene, polypropylene, polyethylene, etc., and preferably a microporous film of polypropylene or polyethylene, especially that of a thickness of 20 to 50 $\mu$m, is used in the respects that it can surely prevent both electrodes from contacting with each other and yet let the electrolyte pass therethrough.

For other constructional elements of the non-aqueous electrolyte battery of the present invention other than the members specified above, what are used generally and publicly known can be used. Moreover, the shape of the non-aqueous electrolyte battery is not limited especially. For the shape, there can be enumerated various shapes such as button-type, paper-type, coin-type, rectangular-type, or cylindrical-type battery having a spiral structure in it, etc. and further each of these batteries can be formed in various sizes, such as thin-type, large-size, etc.

The non-aqueous electrolyte battery of the present invention contains a specified phosphazene derivative having a sulfonyl group in the electrolyte thereof whose base material is an organic solvent, and by designing the blending ratio of the specified phosphazene derivative to the electrolyte, excellent performance can be given to the non-aqueous electrolyte battery. For example, when the addition of the specified phosphazene derivative is relatively small, that is generally in the range of 0.1 to 20 volume %, preferably 0.1 to 10 volume %, in the non-aqueous electrolyte, the phosphazene derivative can suppress the decomposition of the electrolyte without degrading the cycling characteristic by the action thereof as a base, hence realizing excellent preservability, especially at a high-temperature. Further, when the addition of the specified phosphazene derivative is generally in the range of 1 to 80 volume %, preferably 10 to 40 volume %, in the non-aqueous electrolyte, the phosphazene derivative can give flame resistance to the electrolyte, thereby reducing the danger of the bursting and ignition of the battery.

EXAMPLES

Next, enumerating the examples, the present invention will be described more concretely. However, it should be understood that these are merely exemplifications to achieve the objects of the present invention which is not limited thereby.

Reference example 1

Preparation of the Phosphazene Derivative A

First 639.5 g (3.06 moles) of phosphorus pentachloride, 97.1 g (1.54 moles) of sulfamic acid, and 1 L of chlorobenzene were charged in a four-neck flask to which a stirrer was attached were made to react at 100 to 105° C. in a nitrogen atmosphere for 12 hours. After the end of reaction, the reactant was dried and purified through distillation by a routine procedure, and thus 265.7 g of trichlorophosphazo sulfonyl chloride was obtained (yield: 68.8%). Next, 185.3 g (0.74 moles) of trichlorophosphazo sulfonyl chloride obtained with the above-mentioned process and 700 ml of THF were charged in a four-neck flask to which a stirrer was attached and reacted with 1066.5 g (2.96 moles) of an alcoholate solution of diethyleneglycol monomethyl ether at −22 to −20° C. in a nitrogen atmosphere by whole day and night stirring. After the end of reaction, the reactant was neutralized with a concentrated hydrochloric acid. Next, organic phase that was extracted from the reactant into chloroform after washing it with water was dehydrated and condensed, and thus 325.9 g of the phosphazene derivative A expressed in the formula; $(CH_3OCH_2CH_2OCH_2CH_2O)_3P=N-SO_2-O-CH_2CH_2OCH_2CH_2OCH_3$ was obtained (yield: 75.2%).

Identification Data of the Phosphazene Derivative A

Molecular formula: $C_{20}H_{44}NO_{14}PS$ (molecular weight: 585.59); Elementary analysis: Calculated value; H: 7.57%, C: 41.02%, N: 2.39%, S: 5.47%; Measured value; H: 8.46%, C: 40.45%, N: 2.47%, S: 5.63%; $^1$H-NMR: 3.37 ppm(s, 12H), 3.53–3.55 ppm(m, 8H), 3.64–3.66 ppm(m, 8H) 3.75–3.78 ppm(m, 8H), 4.22–4.29 ppm(m, 2H), 4.36–4.41 ppm(m, 6H); MASS: 586(M+1).

Reference Example 2

Preparation of the Phosphazene Derivative B

First 66 g (0.317 mole) of phosphorus pentachloride and 15 g (0.156 mole) of sulfamide were charged in a four-neck flask to which a stirrer was attached and reacted at 120° C. in a nitrogen atmosphere for 1 hour. After the end of reaction, excess phosphorous pentachloride was removed by sublimation, and thus 57 g of bis-(trichlorophosphazo) sulfone was obtained (yield: 100%). Then 46 g (0.126 mole) of bis-(trichlorophosphazo)sulfone obtained with the above-mentioned process and THF were charged in a four-neck flask to which a stirrer was attached and reacted while THF solution made by dissolving 84 g (0.86 mole) of an alcoholate solution of ethylene glycol monomethyl ether in 0.4 L of THF was added dropwisely at −20 to −15° C. in a nitrogen atmosphere by whole day and night stirring. After the reaction ended, the reactant was filtered and dried, and thus 45 g of the phosphazene derivative B expressed in the formula;

$(CH_3OCH_2CH_2O)_3P=N-SO_2-N=P(OCH_2CH_2OCH_3)_3$ was obtained (yield 59%).

Identification data of the phosphazene derivative B

Molecular formula: $C_{18}H_{42}N_2O_{14}P_2S$ (molecular weight: 604.53); Elementary analysis: Calculated value; H: 7.00%, C: 35.76%, N: 4.63%, S: 5.30%; Measured value; H: 7.87%, C: 35.39%, N: 4.58%, S: 5.42%; $^1$H-NMR: 3.38 ppm(s, 18H), 3.61–3.65 ppm(m, 12H, 4.35–4.41 ppm(m, 12H); MASS: 605(M+1).

Examples 1–4 and Comparative Example 1

The positive electrode material was prepared by adding 10 parts of acetylene black as conductive supplementary agent and 10 parts of a Teflon binder as binding agent to 100 parts of $LiCoO_2$ wherein $LiCoO_2$ was used as a positive electrode active material. A coin-type non-aqueous electrolyte secondary battery was fabricated by using: lithium metal as a negative electrode material; a porous film of polypropylene as a separator; a commercially-available aprotic organic solvent (mixture of ethylene carbonate and diethylcarbonate (EC+DEC); manufactured by Toyama Yakuhin Kogyo Co., Ltd.) added with the phosphazene derivative A or B that was prepared in the reference example as mentioned above, by the blending ratio shown in Table 1, as electrolyte. The blending ratio indicates the volumetric fraction of the phosphazene derivative in the non-aqueous electrolyte. By the way, a coin-type non-aqueous electrolyte secondary battery which did not contain the phosphazene derivative according to the present invention in the electrolyte was fabricated and named as the comparative example 1. The batteries fabricated as mentioned above were evaluated for the initial discharging capacity, the discharging capacity at the 20th cycle; the discharging capacity maintenance factor, and a condition when the battery was externally short-circuited, which are shown below.
Table 1 shows those results.

Discharging Capacity and Discharging Capacity Maintenance Factor

A cycle test was performed where charging and discharging were repeated under the conditions of an upper limit voltage of 4.2 V, a lower limit voltage of 2.7 V, a discharging current of 0.2 mA, and a charging current of 0.2 mA; and the discharging capacity at the 1st cycle (initial discharging capacity) (mAh) and at the 20th cycle (mAh) were measured. The discharging capacity maintenance factor is calculated with the following expression Discharging capacity maintenance factor (%)=discharging capacity at the 20th cycle times 100/(initial discharging capacity).

Condition when the Battery is Externally Short-circuited

After the battery was charged and discharged for 5 cycles and charged again up to 3.0 V, the battery was externally short-circuited by connecting the positive and negative electrodes with lead wire. The five batteries so tested were checked for the Change in battery appearance and presence/absence of the bursting and ignition.

TABLE 1

|  | Example 1 | Example 2 | Example 3 | Example 4 | Comparative example 1 |
|---|---|---|---|---|---|
| Kind of phosphazene derivative | A | A | B | B | — |
| Blending ratio (volume %) | 10 | 40 | 10 | 40 | — |
| Initial discharging capacity (mAh) | 148.4 | 147.2 | 152.2 | 145.1 | 133.1 |
| Discharging capacity at 20th cycle (mAh) | 137.3 | 137.5 | 141.7 | 136.4 | 120.2 |
| Discharging capacity maintenance factor | 92.5 | 93.4 | 93.1 | 94.0 | 90.3 |
| Change in battery appearance, presence/absence of electrolyte leakage and fuming | No change | No change | No change | No change | Electrolyte leakage and fuming |

As clearly understood from Table 1, the conventional secondary battery that used an aprotic organic solvent as an electrolyte solvent exhibited the liquid leakage and fuming (comparative example 1) when it was short-circuited; whereas secondary batteries of the examples 1 to 4 that used a mixed solvent containing the specified phosphazene derivative having a sulfonyl group did not exhibit the liquid leakage, bursting, and ignition at all even when it was short-circuited and performed a cell characteristics as much as or more than that of the conventional battery.

Reference Example 3

Preparation of the Phosphazene Derivative C

First 639.5 g (3.06 moles) of phosphorus pentachloride, 97.1 g (1.54 moles) of sulfamic acid, and 1 L of chlorobenzene were charged in a four-neck flask to which a stirrer was attached were made to react at 100 to 105° C. in a nitrogen atmosphere for 4 hours. After the end of reaction, the reactant was dried and purified through distillation by a routine procedure, and thus 265.7 g of trichlorophosphazo sulfonyl chloride was obtained (yield: 68.8%). Next, 97.3 g (0.39 moles) of trichlorophosphazo sulfonyl chloride obtained with the above-mentioned process and 700 ml of THF were charged in a four-neck flask to which a stirrer was attached and reacted with 867.2 g (1.62 moles) of an alcoholate solution of ethyleneglycol monomethyl ether at −40 to −35° C. in a nitrogen atmosphere by whole day and night stirring. After the end of reaction, the reactant was neutralized with an acetic acid. Next, organic phase that was extracted from the reactant into chloroform after washing it with water was dehydrated and concentrated, and thus 129.2 g of the phosphazene derivative A expressed in the formula;

was obtained (yield: 81.3%).

Identification Data of the Phosphazene Derivative C

Molecular formula: $C_{12}H_{28}NO_{10}PS$ (molecular weight: 409.38); Elementary analysis: Calculated; H: 6.89%, C: 35.20%, N: 3.42%, S: 7.83%; Measured value; H: 7.45%, C: 34.88%, N: 3.51%, S: 8.02%; $^1$H-NMR: 3.20 ppm(s, 12H), 3.43–3.49 ppm(m, 8H), and 4.07–4.10 ppm (m, 2H) and 4.16–4.22 ppm(m, 6H); MASS: 410(M+1).

Reference Example 4

Preparation of the Phosphazene Derivative D

First 66 g (0.317 mole) of phosphorous pentachloride and 15 g (0.156 moles) of sulfamide were charged in a four-neck flask to which a stirrer was attached and reacted at 120° C. in a nitrogen atmosphere for 1 hour. After the end of reaction, excess phosphorous pentachloride was removed by sublimation, and thus 57 g of bis-(trichlorophosphazo) sulfone was obtained (yield: 100%). Next, 56 g (0.156 mole) of the bis-(trichlorophosphazo)sulfone obtained with the above-mentioned process and THF are charged in a four-neck flask to which a stirrer was attached and reacted while 437 g (0.96 mole) of THT solution made by dissolving sodium ethoxide in 0.15 L of THF was added dropwisely at −25 to −20° C. in a nitrogen atmosphere by whole day and night stirring.

After the end of reaction, the reactant was filtered and dried, and thus 38 g of the phosphazene derivative D expressed by the following expression was obtained (yield: 57%).

Identification Data of the Phosphazene Derivative D

Molecular formula: $C_{12}H_{30}N_2O_8P_2S$ (molecular weight: 424.37); Elementary analysis: Calculated; H: 7.13%, C: 33.96%, N: 6.60%, S: 7.56%; Measured value; H: 7.56%, C: 33.51%, N: 6.42%, S: 7.95%; $^1$H-NMR: 1.02–1.07 ppm(m, 18H), 3.93–4.03 ppm(m, 12H); MASS: 425(M+1).

Examples 5–8

Non-aqueous electrolyte batteries were fabricated in the similar operation as that of the examples 1–5 except that either of the phosphazene derivative Sample C or the phosphazene derivative Sample D and $LiPF_6$ were added to each of the electrolyte by the blending quantity specified in Table 2, and then evaluated for the initial discharging capacity, the discharging capacity at the 20th cycle, the discharging capacity maintenance factor, and a condition when the circuit was externally short-circuited. The blending quantity of the phosphazene derivative is indicated by the volumetric fraction in the electrolyte. The results are shown in Table 2.

TABLE 2

|  | Example 5 | Example 6 | Example 7 | Example 8 |
|---|---|---|---|---|
| Kind of phosphazene derivative | C | C | D | D |
| Blending ratio (volume %) | 40 | 40 | 10 | 40 |
| Blending quantity of $LiPF_6$ | 0.6mole | 1.0mole | 0.9mole | 0.6mole |
| Initial discharging capacity (mAh) | 145.6 | 140.5 | 144.3 | 141.9 |
| Discharging capacity at 20th cycle (mAh) | 134.0 | 132.1 | 133.6 | 130.8 |
| Discharging capacity maintenance factor | 92 | 94 | 92.6 | 92.2 |

TABLE 2-continued

|  | Example 5 | Example 6 | Example 7 | Example 8 |
|---|---|---|---|---|
| Change in battery appearance, presence/absence of electrolyte leakage and fuming | No change | No change | No change | No change |

Examples 9–33

Fabrication of Cylindrical Non-aqueous Electrolyte Battery

Negative Electrode

The petroleum pitch was used for the starting material, which was calcined at 1000° C. in an inert gas flow to obtain a non-graphitizable carbon material of a character close to that of the glassy carbon. This non-graphitizable carbon was analyzed by X-ray diffraction and the spacing between the (002) planes was measured to be 3.76 angstrom, and the true specific gravity was 1.58 g/cm$^3$. Next, the obtained non-graphitizable carbon material was grounded into carbon material powder whose mean particle size was 10 μm. A negative electrode flux was prepared by mixing 90 parts by weight of this carbon material powder with 10 parts by weight of a binding agent. Here, polyvinylidene fluoride was used as the binding agent. Finally, the negative electrode flux was dispersed into N-methyl-2-pyrolidone to form a slurry. Then this slurry was applied uniformly on both sides of belt-shaped copper foil of 10 μm in thickness for serving as a negative electrode collector and dried to form the negative electrode active material layer, and subsequently compression molded with a roll press to make the negative electrode.

Positive Electrode

LiCoO$_2$ as the positive electrode active material was produced by mixing and calcining 0.5 mole of lithium carbonate and 1 mole of cobalt carbonate at 900° C. in the air for 5 hours. Next, 91 parts by weight of the LiCoO$_2$ so obtained, 6 parts by weight of a conductive agent, and 10 parts by weight of a binding agent were mixed to prepare a positive electrode flux. Here, the graphite was used as the conductive agent, and a copolymer of vinylidene fluoride and hexafluoropropylene was used as the binding agent. Finally, the positive electrode flux was dispersed into N-methyl-2-pyrolidone to form a slurry and this slurry was applied uniformly on both sides of aluminum foil of 20 μm in thickness for serving as the positive electrode collector and dried to form the positive electrode active material layer, and subsequently compression molded with a roll press to make the positive electrode.

Figure 1:
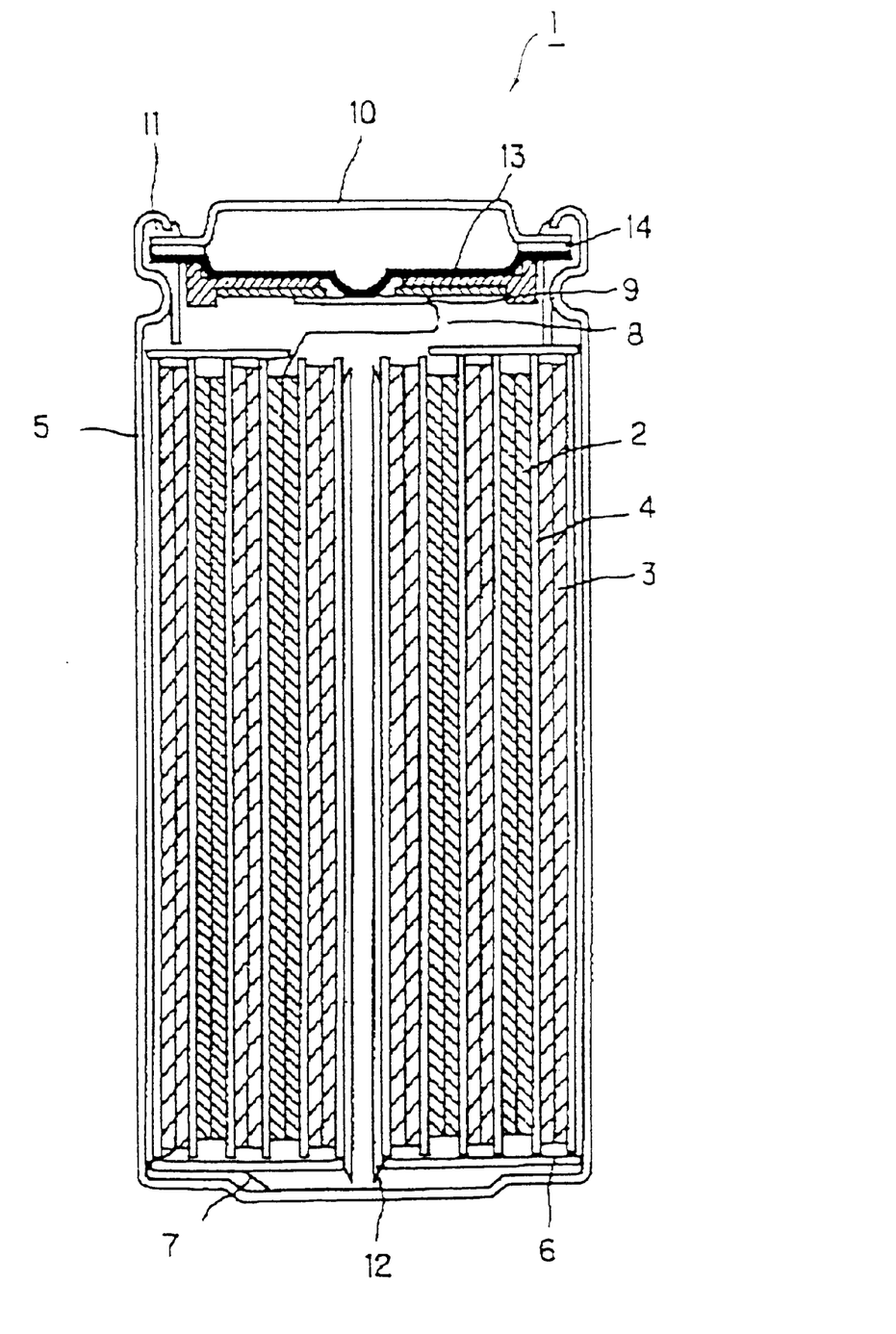
FIG. 1 is a schematic cross section diagram showing one example of the cylindrical non-aqueous electrolyte battery according to the present invention.

The non-aqueous electrolyte battery shown in FIG. 1 was manufactured by using the positive electrode and the negative electrode obtained through the procedure mentioned above. That is, a positive electrode 2 and a negative electrode 3 were made to stick to each other with the medium of a separator 4 composed of a microporous polypropylene of 25 μm in thickness and wound up by a number of times spirally to form a wound body. Next, an insulating plate 6 was inserted in a bottom of a battery can 5 made of steal whose inner part was plated with nickel, and further the above-mentioned wound body so obtained was contained in the battery can 5. Further, for collecting the current of the negative electrode 3, one end of a nickel negative lead 7 was crimped to the negative electrode 3 and the other end thereof was welded to the battery can 5. Further, for collecting the current of the positive electrode 2, one end of an aluminum positive lead 8 was fixed to the positive electrode 2 and the other end thereof was electrically connected to a battery lid 10 with the medium of a thin plate 9 for current interception. This thin plate 9 for current interception serves to intercept the current according to internal pressure of the battery.

Next, the non-aqueous electrolyte was injected into this battery can 5. As a solvent for the non-aqueous electrolyte, used was a mixed liquid that was made by mixing 50 volume % of ethylene carbonate and 50 volume % of diethyl carbonate and further, to 100 weight % of the mixed liquid so obtained, added with one of various phosphazene derivatives shown in Table 3 with the blending ratio shown in Table 4. The blending quantity of the phosphazene derivative is indicated by volumetric fraction (%) in the electrolyte. Finally, the battery lid 10 was fixed to the battery can 5 by making it joined firmly with the battery can 5 with the medium of an insulating, inlet-sealing gasket 11 on which asphalt was applied and thus a cylindrical non-aqueous electrolyte battery 1 of about 18 mm in diameter and about 65 mm in height was prepared. Moreover, the non-aqueous electrolyte battery 1 is provided with a center pin 12 for making connection with the negative electrode lead 7 and the positive electrode lead 8 and also provided with a safety valve device 13 for releasing internal gas when the pressure inside the battery rose higher than a specified value and a PTC device 14 for preventing the temperature rise inside the battery, individually.

TABLE 3

Kinds of phosphazene derivatives

| Sample | Kind of $R^1$ in general formula (1) | Kind of $R^2$ in general formula (2) |
|---|---|---|
| Sample 1 | $CH_3$ | — |
| Sample 2 | $CH_3CH_2$ | — |
| Sample 3 | $CH_3CH_2CH_2$ | — |
| Sample 4 | $CH_3CH_2CH_2CH_2$ | — |
| Sample 5 (Sample C) | $CH_3OCH_2CH_2$ | — |
| Sample 6 | $CF_3OCH_2CH_2$ | — |
| Sample 7 | $CF_3CF_2OCH_2CH_2$ | — |
| Sample 8 | $C_6H_5OCH_2CH_2$ | — |
| Sample 9 | — | $CH_3$ |
| Sample 10 (Sample D) | — | $CH_3CH_2$ |
| Sample 11 | — | $CH_3CH_2CH_2$ |
| Sample 12 | — | $CH_3CH_2CH_2CH_2$ |
| Sample 13 (Sample B) | — | $CH_3OCH_2CH_2$ |
| Sample 14 | — | $CF_3OCH_2CH_2$ |
| Sample 15 | — | $C_6H_5OCH_2CH_2$ |

TABLE 4

Phosphazene derivative

| | Sample | Blending quantity volume % | Sample | Blending quantity volume % |
|---|---|---|---|---|
| Example 9 | Sample 1 | 0.1 | — | — |
| Example 10 | Sample 1 | 0.5 | — | — |
| Example 11 | Sample 1 | 5.0 | — | — |
| Example 12 | Sample 2 | 1.0 | — | — |
| Example 13 | Sample 3 | 1.0 | — | — |
| Example 14 | Sample 4 | 1.0 | — | — |
| Example 15 | Sample 5 | 0.1 | — | — |
| Example 16 | Sample 5 | 1.0 | — | — |
| Example 17 | Sample 5 | 3.0 | — | — |
| Example 18 | Sample 6 | 2.0 | — | — |
| Example 19 | Sample 7 | 2.0 | — | — |
| Example 20 | Sample 8 | 3.0 | — | — |
| Example 21 | Sample 9 | 1.0 | — | — |
| Example 22 | Sample 10 | 0.5 | — | — |
| Example 23 | Sample 11 | 3.0 | — | — |

TABLE 4-continued

| | | Phosphazene derivative | | |
|---|---|---|---|---|
| | Sample | Blending quantity volume % | Sample | Blending quantity volume % |
| Example 24 | Sample 12 | 3.0 | — | — |
| Example 25 | Sample 13 | 3.0 | — | — |
| Example 26 | Sample 14 | 3.0 | — | — |
| Example 27 | Sample 15 | 3.0 | — | — |
| Example 28 | Sample 2 | 0.1 | Sample 10 | 0.1 |
| Example 29 | Sample 2 | 0.2 | Sample 10 | 0.1 |
| Example 30 | Sample 5 | 0.5 | Sample 10 | 0.5 |
| Example 31 | Sample 5 | 1.0 | Sample 13 | 1.0 |
| Example 32 | Sample 5 | 2.0 | Sample 13 | 2.0 |
| Example 33 | Sample 5 | 3.0 | Sample 13 | 2.0 |

Comparative Example 2

A non-aqueous electrolyte battery was fabricated in the similar operation as that of the examples 9–33 except that the phosphazene derivative was not added to the electrolyte.

Comparative Example 3

A non-aqueous electrolyte battery was fabricated in the similar operation as that of the examples 9–33 except that 1 weight % of pyridine, which was intended to act as a neutralizing agent for free acid, was added to the electrolyte instead of the phosphazene derivative.

Comparative Example 4

A non-aqueous electrolyte battery was fabricated in the similar operation as that of the examples 9–33 except that 3 weight % of tributyl phosphate, a flame retarder, was added to the electrolyte instead of the phosphazene derivative.

The non-aqueous electrolyte batteries as fabricated in the examples 9–33 and in the comparative examples 2–4 were evaluated for the initial discharging capacity, the load characteristic, the discharging capacity maintenance factor after the 100th cycle, the high-temperature preservability (self-discharge characteristics), and the results of the evaluation are shown in Table 5. Each evaluation method will be described below.

Initial Discharging Capacity

Each of the non-aqueous electrolyte batteries prepared as mentioned above was charged at a condition of a constant current of 1A and a constant voltage until it reached the upper limit of 4.2 V for 3 hours and then discharged at a constant current of 1000 mA until it reached a final voltage of 2.5 V under the condition of 23° C.

Load Characteristics

The battery was made to charge and discharge by one cycle at the same charge/discharge condition as that of the evaluation of the above-mentioned initial discharging capacity and after charging the battery similarly the battery was made to discharge at a constant current of 2000 mA until it reached the final voltage of 2.5 V. The discharging capacity maintenance factor (%) for 2000 mA was obtained that was a ratio of the discharging capacity for 2000 mA to that for 700 mA which was set to 100.

Discharging Capacity Maintenance Factor

The charge/discharge was performed by 100 cycles with the same charging condition as that of the above-mentioned initial discharging capacity and a ratio of the discharging capacity at the 100th cycle to the initial discharging capacity was obtained.

High-temperature Preservability

The battery was charged with the same charging condition as that of the above-mentioned initial discharging capacity, exposed at 60° C. in the ambient atmosphere, and taken out after 10 days. Next, after 5 hours since taking out the batteries, the batteries were made to discharge at a current of 700 mA at 23° C. in the ambient atmosphere. Then, the discharging capacity maintenance factor of the discharging capacity after the exposure at 60° C. in the ambient atmosphere with respect to the discharging capacity before the preservation was obtained and the difference between this factor to the discharging capacity maintenance factor for the 100 cycle charge/discharge was obtained as self-discharge factor. This value indicates that the smaller this value, the more excellent the high-temperature preservability.

TABLE 5

| | | Initial discharging capacity (mAh) | 2000 mA discharging capacity maintenance factor (%) with reference to 700 mA discharging capacity (%) | Discharging capacity maintenance factor after 100th cycle (%) | 10 days Preservation at 60° C.; Self-discharge rate |
|---|---|---|---|---|---|
| Example | 9 | 1487 | 93.8 | 94.8 | 12.3 |
| | 10 | 1485 | 93.7 | 94.6 | 11.3 |
| | 11 | 1480 | 93.2 | 94.2 | 10.1 |
| | 12 | 1475 | 93.0 | 94.3 | 10.2 |
| | 13 | 1489 | 94.3 | 94.1 | 13.5 |
| | 14 | 1482 | 93.4 | 94.3 | 13.2 |
| | 15 | 1491 | 93.9 | 94.4 | 11.1 |
| | 16 | 1470 | 92.5 | 94.3 | 10.4 |
| | 17 | 1475 | 92.6 | 94.1 | 10.1 |
| | 18 | 1478 | 93.2 | 94.3 | 14.7 |
| | 19 | 1495 | 94.8 | 94.6 | 13.9 |
| | 20 | 1489 | 93.9 | 94.4 | 14.8 |
| | 21 | 1483 | 93.6 | 94.2 | 14.5 |
| | 22 | 1480 | 93.1 | 94.2 | 11.4 |
| | 23 | 1474 | 93.0 | 94.0 | 14.7 |
| | 24 | 1490 | 94.2 | 94.5 | 13.8 |
| | 25 | 1489 | 94.2 | 94.3 | 11.6 |

TABLE 5-continued

|  |  | Initial discharging capacity (mAh) | 2000 mA discharging capacity maintenance factor (%) with reference to 700 mA discharging capacity (%) | Discharging capacity maintenance factor after 100th cycle (%) | 10 days Preservation at 60° C.; Self-discharge rate |
|---|---|---|---|---|---|
|  | 26 | 1476 | 93.9 | 94.1 | 13.9 |
|  | 27 | 1470 | 93.1 | 94.2 | 14.3 |
|  | 28 | 1489 | 94.5 | 94.3 | 10.6 |
|  | 29 | 1481 | 94.6 | 94.5 | 10.4 |
|  | 30 | 1488 | 94.5 | 94.4 | 10.1 |
|  | 31 | 1490 | 93.9 | 94.6 | 10.5 |
|  | 32 | 1489 | 94.3 | 94.5 | 10.3 |
|  | 33 | 1488 | 93.9 | 94.6 | 10.0 |
| Compara- | 2 | 1442 | 91.7 | 94.0 | 15.1 |
| tive | 3 | 1320 | 85.2 | 84.3 | 22.6 |
| example | 4 | 1400 | 86.7 | 84.1 | 23.8 |

As clearly seen from the results of Table 5, it was proved that the battery prepared by adding phosphazene derivative according to the present invention to the non-aqueous electrolyte has an increased initial discharging capacity of the battery and at the same time, a large discharging capacity maintenance factor of 2000 mA with reference to the discharging capacity of 700 mA and excels especially in high-temperature preservability. Moreover, cycling characteristics achieved a satisfactory level.

Example 34

A cylindrical non-aqueous electrolyte battery was fabricated in such a manner that a mixed liquid serving as a solvent for a non-aqueous electrolyte was prepared by mixing 50 volume % of ethylene carbonate and 50 volume % of diethyl carbonate and the phosphazene derivative sample 5 was added to 100 weight % of this mixed liquid so that the phosphazene derivative sample 5 became as much as 0.5 volume % to form a mixed solvent, which was used as an electrolyte; a graphite (manufactured by LONZA S.p.A.; trade name KS-75; spacing between the (002) planes: 3.358 angstrom) was used as a structural material of the negative electrode instead of the non-graphitizable carbon material that was used in the examples 9–33; and the rest of the operations were just like those of the examples 9–33.

Example 35

A cylindrical non-aqueous electrolyte battery was fabricated in such a manner that a mixed liquid serving as a solvent for a non-aqueous electrolyte was prepared by mixing 50 volume % of ethylene carbonate and 50 volume % of diethyl carbonate and the phosphazene derivative sample 13 was added to 100 weight % of this mixed liquid so that the phosphazene derivative sample 13 became as much as 1.5 volume % to form a mixed solvent, which was used as an electrolyte; a graphite (manufactured by LONZA S.p.A; trade name KS-75; spacing between the (002) planes: 3.358 angstrom) was used as a constituent material of the negative electrode instead of the non-graphitizable carbon material that was used in the examples 9–33; and the rest of the operations were just like those of the examples 9–33.

Comparative Example 5

A cylindrical non-aqueous electrolyte battery was fabricated in similar operations as those of the examples 34 and 35 except that no phosphazene derivative was added in the electrolyte.

The cylindrical non-aqueous electrolyte batteries prepared in examples 34, 35 and comparative example 5 were evaluated, in the same way as examples 9–33, for the initial discharging capacity, the load characteristic, the discharging capacity maintenance factor after the 100th cycle, the high-temperature preservability (self-discharge characteristic) and the results are shown in Table 6.

TABLE 6

|  | Initial discharging Capacity (mAh) | 2000 mA discharging Capacity Maintenance factor (%) with reference to discharging capacity for 700 mA | Discharging Capacity Maintenance factor after 100th cycle (%) | 10 days preservation at 60° C.; Self-discharge factor (%) |
|---|---|---|---|---|
| Examples 34 | 1595 | 95.8 | 94.2 | 13.6 |
| Examples 35 | 1590 | 95.5 | 93.9 | 12.1 |
| Comparative example 5 | 1552 | 92.2 | 92.6 | 16.0 |

From the results of Table 6, it was proved that even when graphite was used as the negative electrode material, a non-aqueous electrolyte secondary battery prepared by adding the phosphazene derivative according to the present invention in the non-aqueous electrolyte thereof has a large initial discharging capacity of a cell and also has an enhanced discharging capacity maintenance factor of 2000 mA with respect to the discharging capacity of 700 mA, exhibiting significantly excellent results. In addition, the non-aqueous electrolyte secondary battery has also a satisfactory cycling characteristics and high-temperature preservability.

INDUSTRIAL APPLICABILITY

The non-aqueous electrolyte battery of the present invention that is capable of controlling evaporation and decomposition of the electrolyte whose base material is an organic solvent throughout a wide range of temperatures, has reduced danger of ignition and inflammation in case of short circuiting. As a result, especially high-temperature preservability and superior cell performance can be obtained.

What is claimed is:

1. A non-aqueous electrolyte battery including a positive electrode, a negative electrode capable of occluding and emitting lithium ions, and a non-aqueous electrolyte containing lithium ion;

characterized in that said non-aqueous electrolyte is a solution containing:

at least one kind of the phosphazene derivatives selected from the group consisting of the phosphazene derivatives expressed by the following general formula (1):

$$(R^1O)_3P=N-SO_3R^1 \quad (1)$$

where $R^1$ denotes a same or different monovalent organic group in the expression and phosphazene derivatives expressed by the following general formula (2):

$$(R^2O)_3P=N-SO_2-N=P(OR^2)_3 \quad (2)$$

where $R^2$ denotes a same or different monovalent organic group, and a lithium salt.

2. Non-aqueous electrolyte battery according to claim 1, wherein said monovalent organic group $R^1$ and said monovalent organic group $R^2$ each are one group selected from the group consisting of a linear or branched alkyl group of carbon numbers of 1 to 10, an alkyl group of carbon number of 1 to 10 substituted by a group having an ether linkage, and an alkyl group of carbon number of 1 to 10 substituted by a halogen atom.

3. Non-aqueous electrolyte battery according to either one of claims 1 or 2, wherein said non-aqueous electrolyte is a solution made by dissolving a lithium salt in a mixed solvent in which the said phosphazene derivative and an aprotic organic solvent are mixed.

4. Non-aqueous electrolyte battery according to either one of claims 1 to 2, wherein a content of said phosphazene derivative ranges from 0.1 to 80 volume % in the volume fraction in the non-aqueous electrolyte.

5. Non-aqueous electrolyte battery according to either one of claims 1 to 2, wherein a complex metallic oxide of lithium and a transition metal is used as an active material of the positive electrode.

6. Non-aqueous electrolyte battery according to either one of claims 1 to 2, wherein the negative electrode capable of occluding or emitting lithium ions is a carbon material.

* * * * *